(12) United States Patent
Haupt et al.

(10) Patent No.: US 8,943,290 B2
(45) Date of Patent: Jan. 27, 2015

(54) AUTOMATIC MANAGEMENT OF HETEROGENEOUS MEMORY RESOURCES

(75) Inventors: Michael Haupt, Potsdam (DE); Douglas Norman Simon, Uster (CH); Thomas Wuerthinger, Utzenaich (AT)

(73) Assignee: Oracle International Corporation, Redwood Shores, CA (US)

( * ) Notice: Subject to any disclaimer, the term of this patent is extended or adjusted under 35 U.S.C. 154(b) by 498 days.

(21) Appl. No.: 13/431,771

(22) Filed: Mar. 27, 2012

(65) Prior Publication Data

US 2013/0263116 A1     Oct. 3, 2013

(51) Int. Cl.
*G06F 12/00* (2006.01)
(52) U.S. Cl.
USPC .......................... 711/165; 711/154; 707/814
(58) Field of Classification Search
None
See application file for complete search history.

(56) References Cited

U.S. PATENT DOCUMENTS

| 2003/0069905 | A1* | 4/2003 | Dussud | 707/206 |
| 2008/0301646 | A1* | 12/2008 | Gupta | 717/127 |
| 2011/0047273 | A1* | 2/2011 | Young et al. | 709/226 |

OTHER PUBLICATIONS

Basu, Abhinaba "Back to Basics: Generational Garbage Collection" Mar. 2, 2009. retrieved from http://blogs.msdn.com/b/abhinaba/archive/2009/03/02/back-to-basics-generational-garbage-collection.aspx.*
Chambers, C. et al., "An Efficient Implementation of SELF, a Dynamically-Typed Object-Oriented Language Based on Prototypes," Proceedings of the 1989 OOPSLA Conference, New Orleans, Louisiana, Oct. 1989 (22 pages).
Goldberg, A. et al., "Smalltalk-80: The Language and Its Implementation," Addison-Wesley, 1983, pp. 659-667 (11 pages).

* cited by examiner

*Primary Examiner* — Matthew Bradley
*Assistant Examiner* — Daniel Tsui
(74) *Attorney, Agent, or Firm* — Osha Liang LLP (57) ABSTRACT

A method for resource management, including: identifying a resource map corresponding to a thread stack of a first thread; reading, in the resource map and by a computer processor, a bit value referencing an address of a first binary value in the thread stack; determining, based on the bit value and by the computer processor, that the first binary value corresponds to a managed resource; reading, by the computer processor, a resource identifier section of the first binary value after determining that the first binary value corresponds to the managed resource; determining a type of the managed resource based on the resource identifier section; interpreting, based on the type of the managed resource, at least a portion of a payload of the first binary value as a reference to a resource address of the managed resource in a resource storage; and accessing the managed resource using the reference.

20 Claims, 8 Drawing Sheets

AUTOMATIC MANAGEMENT OF HETEROGENEOUS MEMORY RESOURCES

BACKGROUND

Memory management is a common function of virtual machines. Traditional managed memory systems track dynamically allocated memory corresponding to a single type of memory resource (i.e., object pointers). Common memory management tasks, such as dynamic memory allocation, may be performed by a memory management component (or a garbage collector) of the virtual machine or operating system. The memory management component may also track and reclaim memory which is no longer used.

Traditional garbage collectors are used to track dynamically allocated memory objects in heap memory. Unmanaged memory systems place the burden of memory de-allocation with the programmer. Programmers must carefully plan the lifecycle of dynamically allocated memory objects such that objects are accessible when required and subsequently de-allocated before they can no longer be accessed by running code. If references to memory objects are lost before the memory is released to the operating system, a program may experience an accumulation of inaccessible memory resulting in a memory leak.

One fundamental inefficiency of managed memory systems is the problem of fragmentation. Fragmentation of memory is a symptom of inefficient use of memory resources. Specifically, fragmentation occurs when multiple memory allocations, either in physical or virtual memory, leave gaps of unused memory between allocated memory segments. In some cases, these contiguous segments (i.e., "gaps") of unused memory are too small to be allocated for use by the memory management module. Furthermore, unmanaged memory resources cannot be modified or moved in order to defragment or compact the memory. Memory fragmentation can lead to performance degradation and premature exhaustion in the management of memory resources.

SUMMARY

In general, in one aspect, the invention relates to a method for resource management. The method includes: identifying a resource map corresponding to a thread stack of a first thread; reading, in the resource map and by a computer processor, a bit value referencing an address of a first binary value in the thread stack; determining, based on the bit value and by the computer processor, that the first binary value corresponds to a managed resource; reading, by the computer processor, a resource identifier section of the first binary value after determining that the first binary value corresponds to the managed resource; determining a type of the managed resource based on the resource identifier section; interpreting, based on the type of the managed resource, at least a portion of a payload of the first binary value as a reference to a resource address of the managed resource in a resource storage; and accessing, in the resource storage, the managed resource using the reference.

In general, in one aspect, the invention relates to a system for resource management. The system includes a computer processor, a first thread executing on the computer processor, a resource map corresponding to a thread stack of the first thread and including a set of bit values mapped to addresses of the thread stack, and a memory manager executing on the computer processor and configured to: read, in the resource map, a bit value referencing an address of a first binary value in the thread stack; determine, based on the bit value, that the first binary value corresponds to a managed resource; read a resource identifier section of the first binary value after determining that the first binary value corresponds to the managed resource; determine a type of the managed resource based on the resource identifier section; interpret, based on the type of the managed resource, at least a portion of a payload of the first binary value as a reference to a resource address of the managed resource in a resource storage; and access, in the resource storage, the managed resource using the reference.

In general, in one aspect, the invention relates to a non-transitory computer-readable storage medium including instructions for resource management. The instructions include functionality to: identify a resource map corresponding to a thread stack of a first thread; read, in the resource map, a bit value referencing an address of a first binary value in the thread stack; determine, based on the bit value, that the first binary value corresponds to a managed resource; read a resource identifier section of the first binary value after determining that the first binary value corresponds to the managed resource; determine a type of the managed resource based on the resource identifier section; interpret, based on the type of the managed resource, at least a portion of a payload of the first binary value as a reference to a resource address of the managed resource in a resource storage; and access, in the resource storage, the managed resource using the reference.

Other aspects of the invention will be apparent from the following description and the appended claims.

DETAILED DESCRIPTION

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method and system for memory management. Within a runtime environment, a resource map is maintained corresponding to a thread stack of an executing thread. A bit value corresponding to an address of a binary value in the thread stack is read from the resource map. The bit value identifies whether or not the binary value in the thread stack corresponds to a managed resource. A type of the managed resource may be identified by a resource identifier section of the binary value. Based on the type, at least a portion of a payload of the binary value may be interpreted as a reference used to identify the managed resource in a resource storage.

Figure 1A:
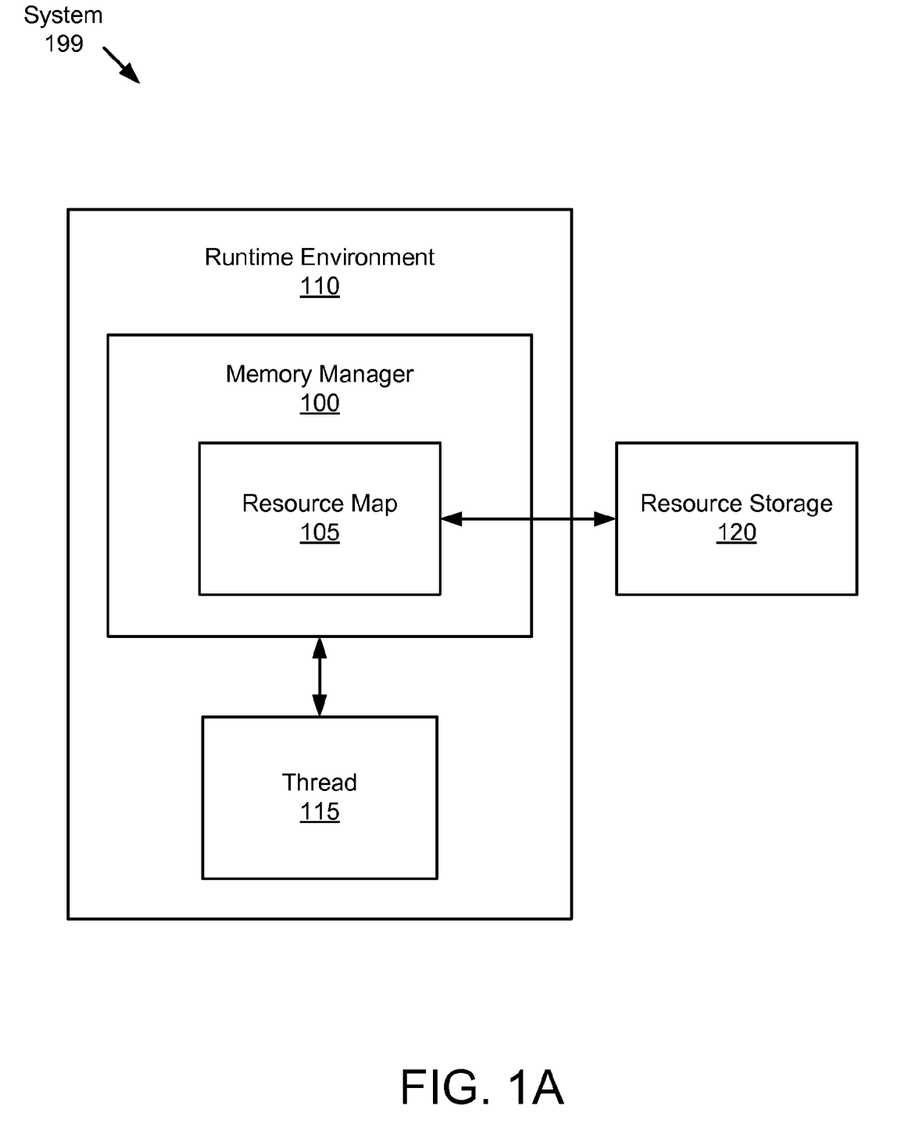
FIGS. 1A and 1B show schematic diagrams of a system in accordance with one or more embodiments of the invention.

FIG. 1A shows a system (199) in accordance with one or more embodiments of the invention. As shown in FIG. 1A, the system has multiple components including a memory manager (100), a resource map (105), a runtime environment (110), a thread (115), and a resource storage (120). Various components of the system (199) may be located on the same device (e.g., a server, mainframe, desktop Personal Computer (PC), laptop, Personal Digital Assistant (PDA), telephone, mobile phone, kiosk, cable box, and any other device) or may be located on separate devices connected by a network (e.g. the Internet), with wired and/or wireless segments. Those skilled in the art will appreciate that there may be more than one of each separate component running on a device, as well as any combination of these components within a given embodiment of the invention.

In one or more embodiments of the invention, examples of a managed resource may include, but are not limited to, an object, an executable file, a shared library, a set of executable code, a file, a result set from obtained from a database, a remote object, a shared memory, dynamically allocated memory, and/or any other resource capable of being accessed by one or more clients or threads. The resource may reside within a set of resources (e.g., heap memory, database instance, file system, etc.) accessible by two or more clients.

In one or more embodiments of the invention, the runtime environment (110) is an operating system or other platform enabling the execution of one or more programs. The runtime environment (110) may include a collection of data, processes, and/or concurrently executing threads configured to execute one or more application programs and to support type checking, debugging, and/or code optimization.

In one or more embodiments of the invention, the memory manager (100) is a software component within or operatively connected to the runtime environment (110). The memory manager (100) may include a collection of one or more threads and/or data configured to perform memory management. In one or more embodiments of the invention, the memory manager (100) includes functionality to implement one or more garbage collection algorithms (e.g., mark and sweep, etc.) in order to prevent memory leaks, perform compaction of the resource storage (120), allocate/de-allocate managed resources, and/or to perform any number of other tasks requiring identification of stack roots (i.e., resource values) corresponding to managed resources.

Figure 1B:
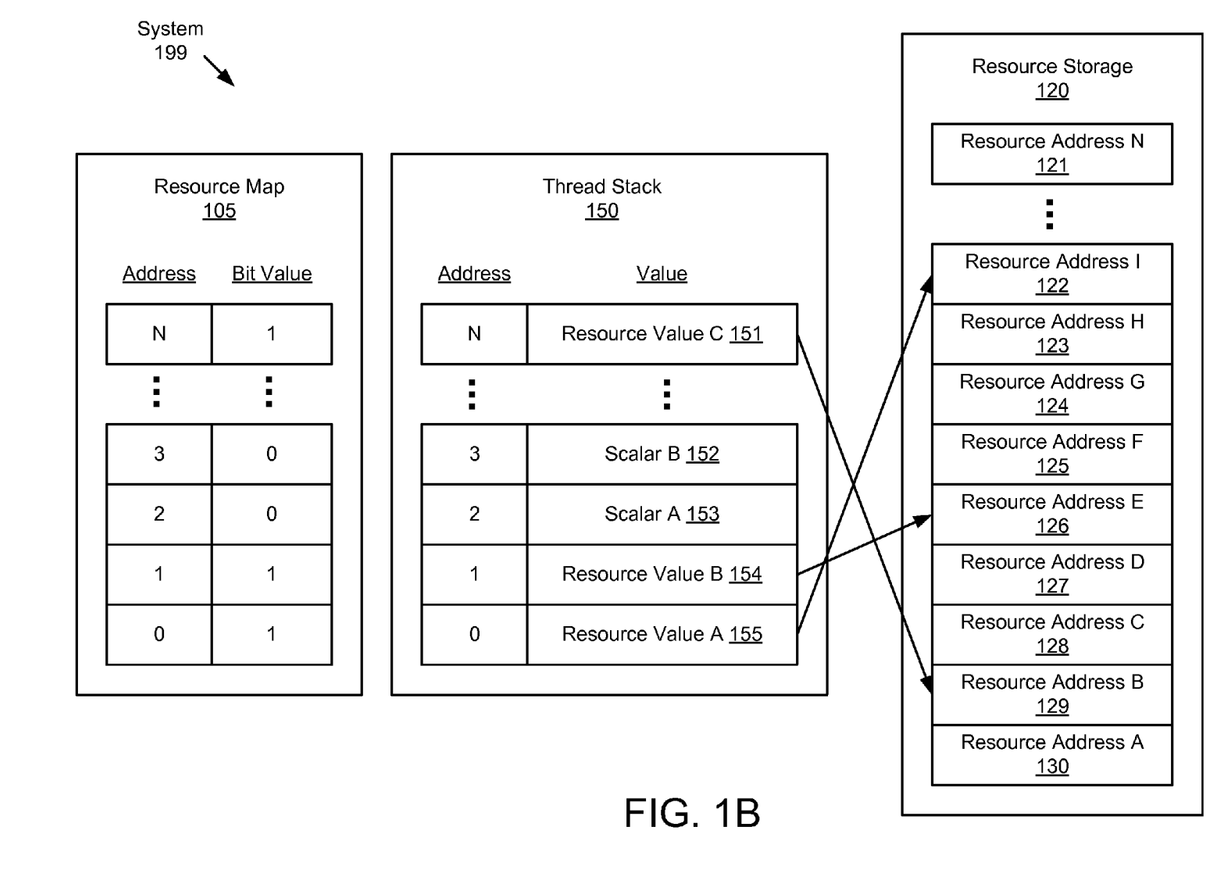

FIG. 1B shows the system (199) in accordance with one or more embodiments of the invention. As shown in FIG. 1B, the system has multiple components including a thread stack (150) having resource values (e.g., resource value A (155), resource value B (154), resource value C (151)) and scalars (e.g., scalar A (153), scalar B (152)), the resource map (105), and the resource storage (120) having a set of resource addresses (e.g., resource address A (130), resource address B (129), resource address C (128), resource address D (127), resource address E (126), resource address F (125), resource address G (124), resource address H (123), resource address I (122), resource address N (121)). These various components of the system (199) may be located on the same device (e.g., a server, mainframe, desktop Personal Computer (PC), laptop, Personal Digital Assistant (PDA), telephone, mobile phone, kiosk, cable box, and any other device) or may be located on separate devices connected by a network (e.g. the Internet), with wired and/or wireless segments. Those skilled in the art will appreciate that there may be more than one of each separate component running on a device, as well as any combination of these components within a given embodiment of the invention.

In one or more embodiments of the invention, the memory manager (100) is configured to create the resource map (105). The resource map (105) is a structure having at least one bit value for each element in the thread stack (150) of the thread (115). In one or more embodiments of the invention, a bit value of '1' indicates that the element in the thread stack (150) is a resource value corresponding to a managed resource. Conversely, in one or more embodiments of the invention, a bit value of '0' indicates that the corresponding element in the thread stack (150) is not a resource value corresponding to a managed resource. In one or more embodiments of the invention, the resource map (105) includes a single bit per element in a thread stack (150) of a thread (115). The single bit indicates whether or not the element corresponds to a managed resource. In other embodiments, the resource map (105) may include more than one bit per element in the thread stack (150). If more than one bit is used, the value of the bits may indicate a type of a managed resource referenced by the element in the thread stack (150). In one or more embodiments of the invention, a single resource map (105) is created for each executing thread in the runtime environment (110). Alternatively, in other embodiments of the invention, a single resource map (105) may be created for any number of executing threads.

In one or more embodiments of the invention, the memory manager (100) includes functionality to read a bit value in the resource map (105). The bit value may be a value of a single bit or any number of bits corresponding to an element in the thread stack (150), in accordance with various embodiments of the invention. The memory manager (100) may determine, based on the bit value, whether the corresponding element in the thread stack (150) is a resource value referencing a managed resource. If the bit value indicates that the element is a scalar, the memory manager (100) may be configured to read or write the scalar value directly. If the bit value indicates that the element is a resource value of a managed resource, the memory manager (100) may be configured to determine a type of the managed resource and to access the managed resource in the resource storage (120).

In one or more embodiments of the invention, the thread stack (150) is a region of memory reserved for storage required by the thread (115). The runtime environment (110) allocates a thread stack for each executing thread. The thread stack (150) may include locations of function calls, state data, variables (e.g., scalars), and/or other data required for execution of the thread (115). The thread stack (150) may also include one or more resource values.

Figure 2:
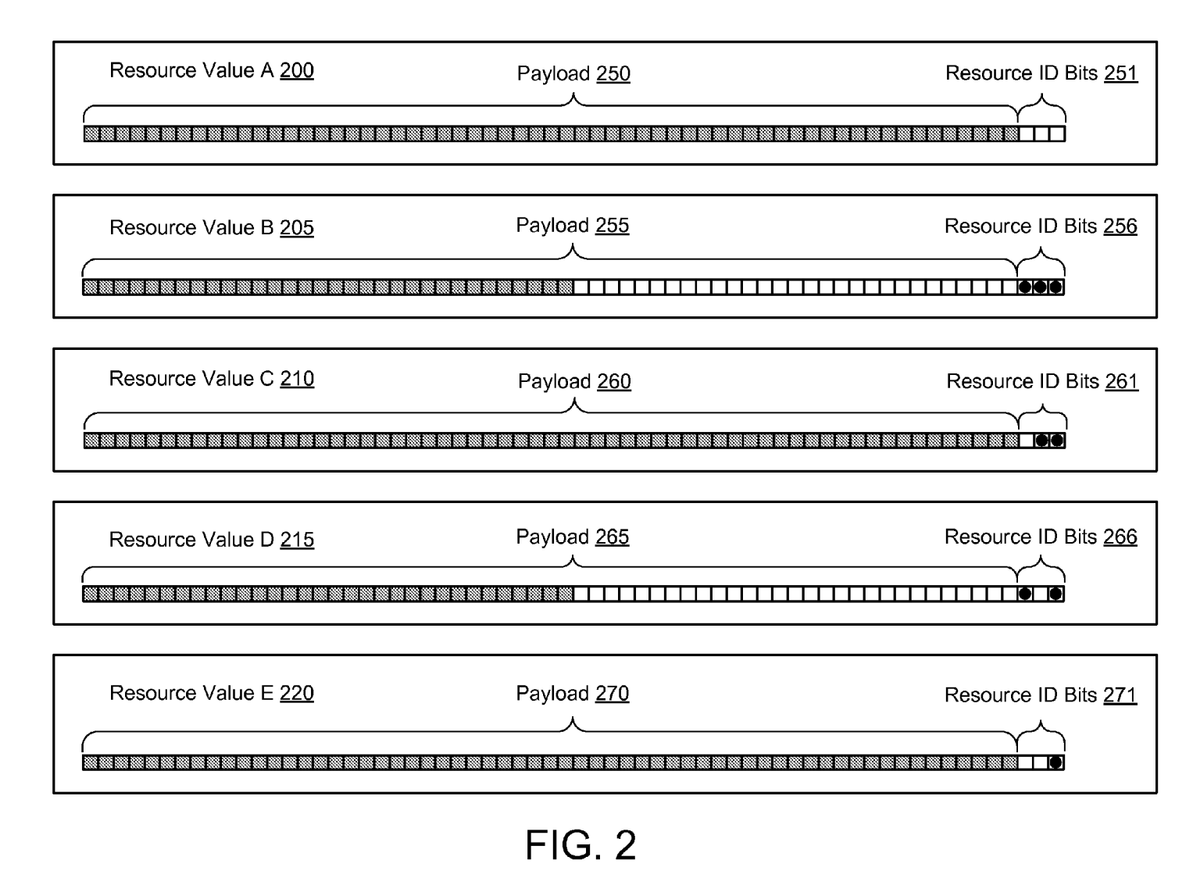
FIG. 2 shows examples of different types of resource pointers in accordance with various embodiments of the invention.

FIG. 2 shows examples of different types of resource values (e.g., resource value A (200), resource value B (205), resource value C (210), resource value D (215), resource value E (220)) in accordance with various embodiments of the invention. Resource values may reference managed resources residing within the same device (e.g., a server, mainframe, desktop Personal Computer (PC), laptop, Personal Digital Assistant (PDA), telephone, mobile phone, kiosk, cable box, and any other device) or may reference managed resources located on separate devices connected by a network (e.g. the Internet), with wired and/or wireless segments.

In one or more embodiments of the invention, a resource value is a reference used to identify a managed resource in the resource storage (120). A resource value may be a direct pointer to the managed resource or may include an index into another structure (e.g., an object table) containing a reference to the resource. Each resource value may include a payload and a resource identifier section (i.e., one or more resource identifier bits).

In one or more embodiments of the invention, the resource identifier section is a portion of the resource value containing one or more bit values depicting a type of the managed resource. Any number of different managed resource types may exist (limited only by the number of bits of the resource identifier section). Examples of a managed resource type may include, but are not limited to, object, executable file, shared library, executable code, file, result set obtained from a database, remote object, shared memory, dynamically allocated memory, and/or any other type of one or more resources capable of being accessed by one or more clients or threads.

In one or more embodiments of the invention, the payload of the resource value is the set of bits outside of the resource identifier section. The payload may be any subset of the bits of the resource value, and may include a direct reference to the resource or any other means of locating the resource (e.g., an index into an object table), in accordance with various embodiments of the invention.

In a first example, in a 64-bit architecture with word alignment, resource value A (200) is a 64-bit binary value consisting of a 61-bit payload (250) and 3-bit resource identifier section (251). In this example, the resource ID bits (251) are '000', which indicates that the resource value is of the object pointer type. In this example, any portion of the 61-bit payload may be used to store a reference to the managed object in the resource storage (120).

In a second example, resource value B (205) is a 64-bit binary value consisting of a 61-bit payload (255) and 3-bit resource identifier section (256). In this example, the resource ID bits (256) are '111', which indicates that the resource value is of the boxed integer type. In this example, the 32 most significant bits of the 61-bit payload store the boxed integer value.

In a third example, resource value C (210) is a 64-bit binary value consisting of a 61-bit payload (260) and 3-bit resource identifier section (261). In this example, the resource ID bits (261) are '011', which indicates that the resource value is of the large integer type. In this example, the 61-bit payload stores the two's complement large integer value.

In a fourth example, resource value D (215) is a 64-bit binary value consisting of a 61-bit payload (265) and 3-bit resource identifier section (266). In this example, the resource ID bits (266) are '101', which indicates that the resource value is of the boxed float type. In this example, the 32 most significant bits of the 61-bit payload store the boxed float value.

In a fifth example, resource value E (220) is a 64-bit binary value consisting of a 61-bit payload (270) and 3-bit resource identifier section (271). In this example, the resource ID bits (271) are '001', which indicates that the resource value is of the code pointer type. In this example, the 61-bit payload stores a reference to the code pointer in memory (e.g., resource storage (120) of FIG. 1A, discussed above). The reference is a 61-bit offset from the smallest possible machine code address of the memory.

Returning to the system (199) of FIGS. 1A and 1B, in one or more embodiments of the invention, the memory manager (100) includes functionality to identify and read a resource identifier section of a resource value. In one or more embodiments of the invention, the memory manager (100) only reads the resource identifier section after determining that the element in the thread stack (150) contains a resource value corresponding to a managed resource. In this way, the overhead of reading elements in the thread stack (150) may be avoided for elements not corresponding to a managed resource.

In one or more embodiments of the invention, the memory manager (100) includes functionality to determine a type of the managed resource based on the resource identifier section of the resource value. In a simple example, when the resource identifier section consists of only 1 bit, the memory manager (100) may identify the managed resource as either (1) a traditional object in heap memory or (2) a code pointer to a binary in a resource storage (120), depending on the bit value. The resource identifier section may consist of any number of bits and any mapping of bit values to managed resource types may be used, in accordance with various embodiments of the invention.

In one or more embodiments of the invention, the memory manager (100) includes functionality to interpret, based on the type of the managed resource, at least a portion of the payload of the resource value as a reference to a resource address of the managed resource in the resource storage (120). Thus, for example, the payload may include a reference to a dynamically allocated object in heap memory. In another example, the payload includes an index into an object table. In this way, the memory manager (100) may be configured to identify the resource using the payload of the resource value. The memory manager (100) may be configured to identify and read the payload of the resource value in response to determining the type of the managed resource.

In one or more embodiments of the invention, the resource storage (120) is any physical or logical structure containing one or more managed resources. Examples of a resource storage (120) may include, but are not limited to, an addressable memory (e.g., a heap memory), a code cache, a file system, a database, and/or any portion or combination thereof. The addressable memory may be any type of memory implemented on any platform and using any addressing mechanism. Thus, the resource storage (120) may be a designated structure or area in a virtual memory, a segmented memory, a physical or virtual cache, a physical memory on one or more primary storage devices (e.g., a random access memory (RAM)), and/or any other type of memory, in accordance with various embodiments of the invention.

In one or more embodiments of the invention, the memory manager (100) includes functionality to access the managed resource in the resource storage (120) using the reference obtained from the payload of the resource value. Alternatively, in one or more embodiments of the invention, the reference may be obtained from an object table or other source, using an index or other information obtained from the payload. The memory manager (100) may, in response to one or more instructions from the thread (115), read, write, modify, move, remove, and/or de-allocate the managed resource.

In one or more embodiments of the invention, the memory manager (100) includes functionality to perform a compaction of the resource storage (120). As a result of the compaction, the memory manager (100) may reduce or eliminate fragmentation of the resource storage (120) by combining one or more unallocated segments of the resource storage (120). The compaction of the memory may involve or be performed in conjunction with any garbage collection or defragmentation algorithm. For example, the memory manager (100) may be configured to perform a moving mark and sweep algorithm and may perform the compaction in conjunction with such an algorithm.

In one or more embodiments of the invention, the memory manager (100) includes functionality to determine that the resource storage (120) has exceeded a resource availability threshold. The resource availability threshold may be any criterion or combination of criteria for determining that the resource storage (120) should be defragmented. Examples of a resource availability threshold may include, but are not limited to, exceeding a predefined number of unallocated contiguous regions of the resource storage (120), a trigger or requirement from a garbage collection algorithm to move one or more managed resources (e.g., upon allocation/de-allocation of a region of the resource storage (120), after a sweep operation, etc.), a mathematical formula using a percentage of allocated regions of the resource storage (120) or a fragmentation index of the resource storage (120), and/or any other criteria for determining that a predefined level of fragmentation of the resource storage (120) is exceeded.

In one or more embodiments of the invention, the memory manager (100) includes functionality to identify one or more unallocated segments of the resource storage (120). The memory manager (100) may identify the unallocated region(s) in conjunction with a garbage collection algorithm (e.g., by sweeping the resource storage (120)), using a reference tree maintaining references to all allocated managed resources in the resource storage (120), by traversing the thread stack (150) to check for references to allocated memory, and/or using any other method of memory management, in accordance with one or more embodiments of the invention.

In one or more embodiments of the invention, the memory manager (100) includes functionality to compact the resource storage (120) by consolidating unallocated segments into a single contiguous segment. During consolidation of the unallocated segments, the memory manager (100) may be configured to move one or more managed resources. The process of moving one or more managed resources may be performed with or without denying access to the managed resources (depending on the algorithm used), in accordance with various embodiments of the invention.

In one or more embodiments of the invention, the memory manager (100) includes functionality to update the payload of one or more resource values to reference new addresses of the resource storage (120) in order to move a managed resource. The memory manager (100) may also update any number of other structures used in the management of memory (e.g., a reference tree or an object table) to reference the new address.

In one or more embodiments of the invention, the memory manager (100) includes functionality to maintain one or more sets of managed value locations where such locations are not on a thread stack and are thus not tracked by a resource map. In one or more embodiments of the invention, the memory manager (100) is configured to use the set(s) in addition to the resource maps to determine where resource values are located.

In one or more embodiments of the invention, the memory manager (100) includes functionality to store one or more different types of managed resources in one or more dedicated regions of the resource storage (120). In this way, the cost of performing an iteration of the resource storage (120) in order to perform garbage collection or to otherwise identify allocated memory regions may be significantly reduced (i.e., only the dedicated regions will be iterated).

In one or more embodiments of the invention, the memory manager (100) includes functionality to manage code pointers referencing executable code. The code pointers may reference executable code in a code cache. In one or more embodiments of the invention, the code cache includes machine code instructions corresponding to compiled code. As such, the runtime environment (110) may use the code cache to execute the compiled code. Thus, in one example, when compiling code using a code pointer, the memory manager (100) is configured to set a bit value in a resource map (105) to '1', indicating that a corresponding resource value references, either directly or indirectly, a managed resource. In this example, the resource map (105) stores a single bit per element in the thread stack (150). The resource identifier section of the resource value may be set to indicate that the managed resource is of the type code pointer. The memory manager (100) may, based on detecting the type, interpret at least a portion of the payload as a reference (i.e., an address) to executable code in the code cache. The memory manager (100) may further be configured to move the executable code and to update the payload accordingly (e.g., in order to compact the code cache).

In one or more embodiments of the invention, the memory manager (100) includes functionality to maintain inner object pointers for managed objects in memory. An inner object pointer may be a pointer to any field or member of the managed object. The pointer may be a direct pointer to the inner object (rather than an offset), and thus, the memory manager (100) may be configured to update the inner object pointer when the object is moved to a new memory location. In one or more embodiments of the invention, inner object pointers are maintained as a separate managed resource type. The memory manager (100) may maintain inner object pointers for fields and members which are frequently accessed by the containing thread (115). For example, the memory manager (100) may be configured to create an inner object pointer upon detecting that a member or field of a managed object is accessed a predefined number of times within a given time period or within the life of the thread (115).

In one or more embodiments of the invention, the memory manager (100) includes functionality to manage one or more shared memory resources. A shared memory resource may be any allocation of memory shared between two or more threads. In one or more embodiments of the invention, the shared memory facilitates inter-process communication and/or data transfer. Thus, in one example, the memory manager (100) is configured to set a bit value in a resource map (105) to '1', indicating that a corresponding resource value references, either directly or indirectly, a managed resource. In this example, the resource map (105) stores a single bit per element in the thread stack (150). The resource identifier section of the resource value may be set to indicate that the type of the managed resource is shared memory. The memory manager (100) may, based on detecting the type, interpret at least a portion of the payload as a reference (i.e., an address) to the shared memory in a resource storage (120) (e.g., the heap). The memory manager (100) may further be configured to move the shared memory and to update the payload accordingly (e.g., in order to compact the resource storage (120)).

In one or more embodiments of the invention, the memory manager (100) includes functionality to manage a native object residing outside of the runtime environment (110). The programming language of the runtime environment (110) may provide an interface for interaction with such native objects. Thus, in one example, the memory manager (100) is configured to set a bit value in a resource map (105) to '1' indicating that a corresponding resource value, either directly or indirectly, references a managed resource. In this example, the resource map (105) stores a single bit per element in the thread stack (150). The resource identifier section of the resource value may be set to indicate that the type of the managed resource is an external native object. The memory manager (100) may, based on detecting the type, interpret at least a portion of the payload as a reference (i.e., an address) to the native object in a resource storage (120) (e.g., the file system). The memory manager (100) may further be configured to move the native object and to update the payload accordingly (e.g., in order to compact the resource storage (120)).

In one or more embodiments of the invention, the memory manager (100) includes functionality to manage a remote object residing in an external physical or virtual node of a networked system. Thus, the runtime environment (110) may reside on a first node and the remote object may reside on a second node, where the first and second nodes are communicatively connected over a computer network. In one example, the memory manager (100) may be configured to set a bit value in a resource map (105) to '1', indicating that a corresponding resource value references, either directly or indirectly, a managed resource. In this example, the resource map (105) stores a single bit per element in the thread stack (150). In one or more embodiments of the invention, the reference includes a combination of a host internet protocol (IP) address and an identifier (e.g., address or index into a remote object table on the host). In this case, the memory manager (100) may be configured to send a request to read or modify the remote object to the host node. The request may include the identifier of the remote object. In one or more embodiments of the invention, the reference in the payload of the resource value does not include a host IP address, and instead includes an index to an object management table. The object management table (not shown) is a data structure storing references to any number of remote objects accessible by nodes in the network. The object management table may be a local data structure or may reside on a separate node of the network, in accordance with various embodiments of the invention.

In one or more embodiments of the invention, the memory manager (100) is configured to send a notification of object liveliness to a remote host storing a remote object. The notification of object liveliness may notify the remote host as to whether or not the object is still referenced by an executing thread on the local node. The memory manager (100) may be configured to periodically send such notifications. The notifications may be sent, pushed, pulled, and/or otherwise used to maintain referenced objects and to de-allocate unreferenced objects, in accordance with various embodiments of the invention. In one example, the memory manager (100) is configured to send a release notification to the remote host, notifying the remote host that no references to the remote object remain within the local host. In one or more embodiments of the invention, any number of nodes may include references to the same remote object. As such, the memory manager (100) may be configured to determine (e.g., based on receiving one or more release notifications, polling, or some other mechanism) that the remote object is no longer referenced by any other nodes. Upon determining that the remote object is no longer referenced, the memory manager (100) may be configured to de-allocate the remote object and to free a portion of memory storing the remote object.

In one or more embodiments of the invention, the memory manager (100) includes functionality to execute programs written in both a host programming language and a guest programming language. The guest language may have different object reference semantics than the host language. In one or more embodiments of the invention, if the guest language has different object reference semantics than the host, the memory manager (100) includes functionality to create an object table in order to store references to objects for guest language programs. For example, the object table may be a data structure storing addresses of the objects in heap memory. Thus, the memory manager (100) may utilize bit tagging (i.e., using a resource identifier section of the resource values) to identify a type of the managed resource. If the memory manager (100) determines that the managed resource is an object of the guest programming language, the memory manager (100) may interpret at least a portion of the payload of the resource value as an index into the object table. The memory manager (100) may then use the index to fetch a reference to the object in memory from the object table. In this way, in one or more embodiments of the invention, the payload stores only indices into the object table, and not direct references to the managed resources themselves. In one or more embodiments of the invention, the object table may further identify multiple managed resource types for the guest programming language. Thus, entries in the object table may further identify a type of the managed resource and the memory manager (100) may be configured to interpret a payload of each entry as a reference to the managed resource in a correct storage location based on the type.

The object table may be used in conjunction with a resource map (105) and/or bit tagging, in accordance with various embodiments of the invention. Thus, the resource map (105) may be used to identify managed resources and bit tagging (i.e., a resource identifier section of the resource value) may be used to identify a type of the managed resource (e.g., host programming language object, guest programming language object, code pointer, etc.). In one or more embodiments of the invention, the managed resource types of the host programming language and the guest programming language may be different, even when the same resource is being referenced. Thus, the "type" of the managed resource may also be dependent upon the object reference semantics being used.

In one or more embodiments of the invention, the memory manager (100) includes functionality to communicate with an external software application (not shown). The external software application may be configured to perform memory management functions (e.g., compaction) of the resource storage (120) in response to messages received from the memory manager (100), in accordance with one or more embodiments of the invention. While the system (199) includes a single resource storage (120) for purposes of illustration, any number of resource storages containing any number of resource types may be used. Thus, the memory manager (100) may be configured to perform the functionality described herein using multiple resource storages in order to manage multiple types of managed resources, in accordance with various embodiments of the invention.

In one or more embodiments of the invention, the runtime environment (110) may perform some or all of the functionality of the memory manager (100). Thus, while the system (199) may include a memory manager (100), the runtime environment (110) may delegate one or more of the above described functions of the memory manager (100) to other processes or threads or may perform one or more of the functions without using a dedicated memory manager (100) component.

Figure 3:
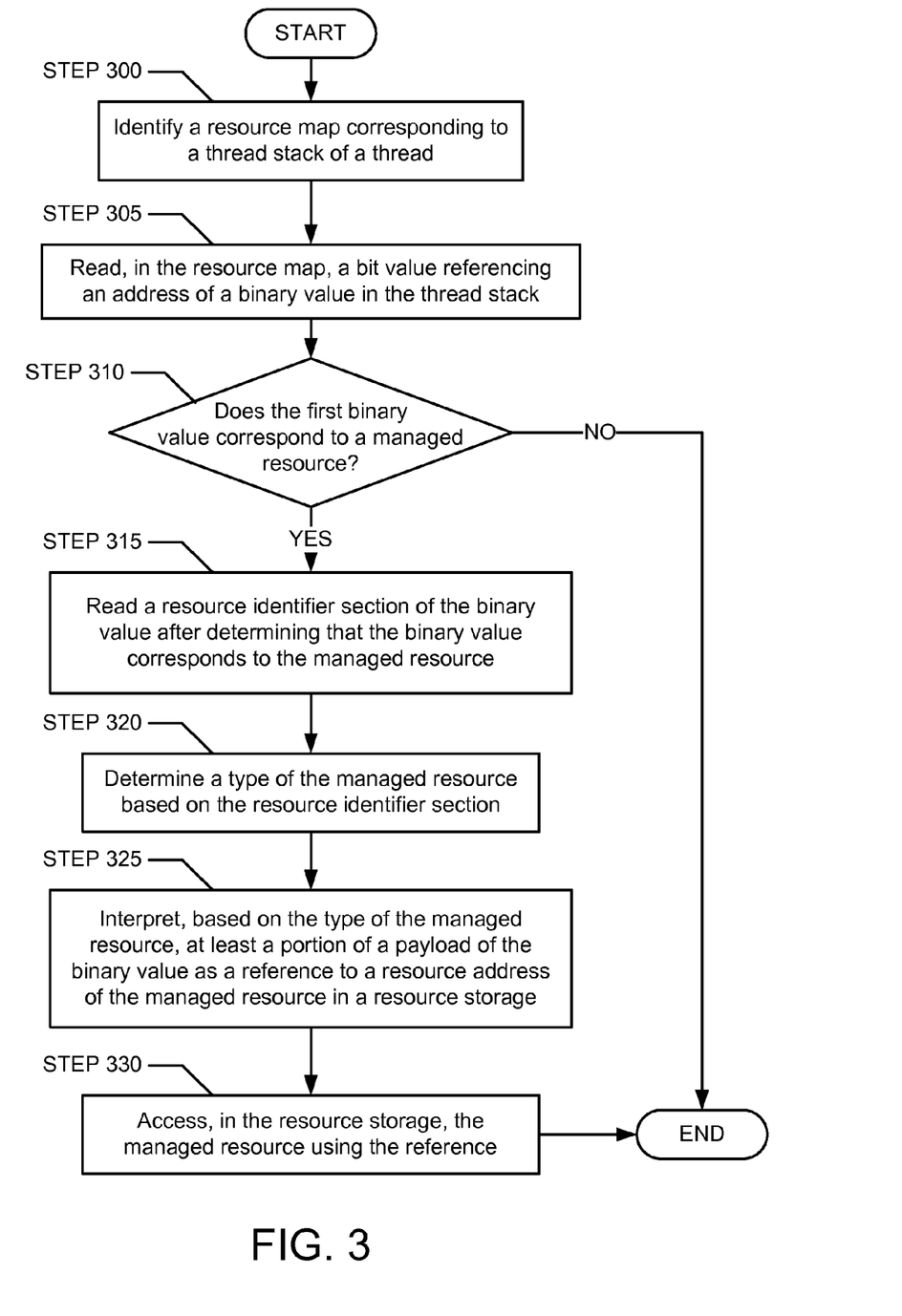
FIGS. 3 and 4 show flowcharts in accordance with one or more embodiments of the invention.

FIG. 3 shows a flowchart of a method for memory management. While the various steps in this flowchart are presented and described sequentially, one of ordinary skill will appreciate that some or all of the steps may be executed in different orders and some or all of the steps may be executed in parallel. Further, in one or more embodiments of the invention, one or more of the steps described below may be omitted, repeated, and/or performed in a different order. Accordingly, the specific arrangement of steps shown in FIG. 3 should not be construed as limiting the scope of the invention.

In STEP 300, in one or more embodiments of the invention, a resource map corresponding to a thread stack of a thread is identified. The resource map may be identified in response to initiating a garbage collection algorithm (e.g., the marking phase of a mark and sweep algorithm). The resource map may include one or more bits containing bit values for each element in the thread stack.

In STEP 305, in one or more embodiments of the invention, a bit value referencing an address of a binary value in the thread stack is read from the resource map. The bit value may be any value of one or more bits designated for an element in the thread stack.

In STEP 310, in one or more embodiments of the invention, it is determined whether the binary value corresponds to a managed resource or not. If it is determined that the binary value corresponds to a managed resource, the process proceeds to STEP 315. If it is determined that the binary value does not correspond to a managed resource, the process ends. In one or more embodiments of the invention, if the resource map includes a single bit per thread stack element, a bit value of '1' indicates that the element corresponds to a managed resource while a thread stack of '0' indicates that the element does not correspond to a managed resource. Any mapping of the bit value may be used to identify managed resources, in accordance with various embodiments of the invention. The bit value may also indicate a type of the managed resource, if more than one bit is designated per element in the thread stack, in one or more embodiments of the invention.

In STEP 315, in one or more embodiments of the invention, a resource identifier section of the binary value is read after determining that the binary value corresponds to a managed resource. The resource identifier section may be any predefined segment or portion of bits of the binary value stored in the thread stack element. The binary value may be read in response to determining that the thread stack element corresponds to a managed resource (i.e., in STEP 310).

In STEP 320, in one or more embodiments of the invention, a type of the managed resource is determined based on the resource identifier section. Any predefined mapping of resource types to different values of the resource identifier section may be used, in accordance with various embodiments of the invention. The mapping may also be created, added, changed, and/or modified by a runtime environment (e.g., runtime environment (110) of FIG. 1A, discussed above) or a component thereof.

In STEP 325, in one or more embodiments of the invention, based on the type of the managed resource, at least a portion of a payload of the binary value is interpreted as a reference to a resource address of the managed resource in a resource storage. The portion of the payload may be used to create a reference object stored in a remembered set, a reference tree, or data structure utilized in a garbage collection or memory management algorithm, in accordance with various embodiments of the invention.

In STEP 330, in one or more embodiments of the invention, the managed resource is accessed using the reference. The managed resource may be accessed by a runtime environment or other local process or may be accessed by a remote process executing on a separate physical device. In one or more embodiments of the invention, if the managed resource resides in a remote resource storage, a local memory manager (e.g., memory manager (100) of FIG. 1A, discussed above) sends a message to an external process requesting information from the managed resource. The message may include an identifier of the managed resource, one or more security credentials, and/or a request type (e.g., read, write, delete, lock, etc.).

Figure 4:
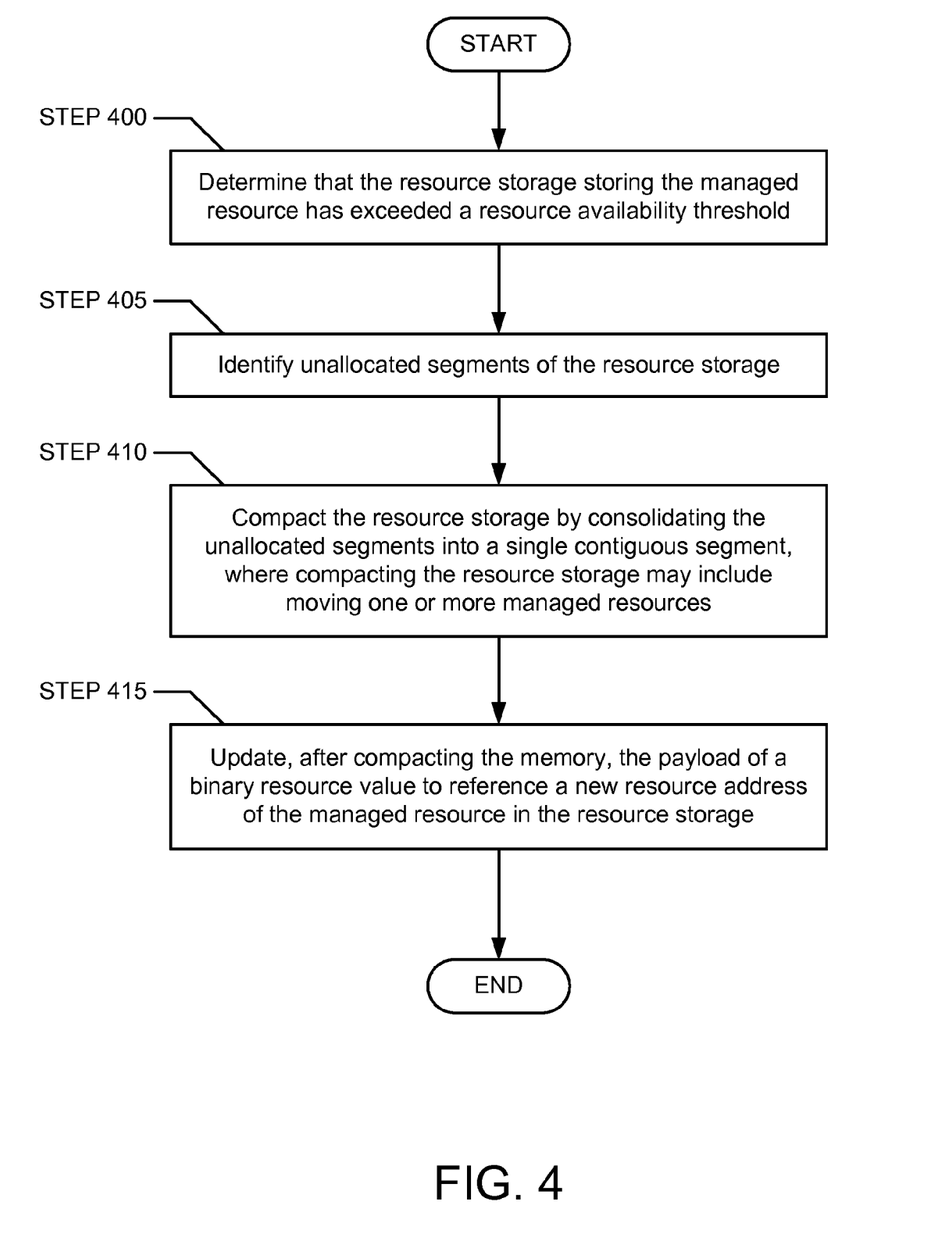

FIG. 4 shows a flowchart of a method for compacting a memory including a managed resource. While the various steps in this flowchart are presented and described sequentially, one of ordinary skill will appreciate that some or all of the steps may be executed in different orders and some or all of the steps may be executed in parallel. Further, in one or more embodiments of the invention, one or more of the steps described below may be omitted, repeated, and/or performed in a different order. Accordingly, the specific arrangement of steps shown in FIG. 4 should not be construed as limiting the scope of the invention.

In STEP 400, in one or more embodiments of the invention, it is determined that the resource storage storing the managed resource has exceeded a resource availability threshold. The resource availability threshold may be any objective limit for initiating a compaction of the resource storage. The resource availability threshold may correlate positively with an actual level of fragmentation on the resource storage, or may be an arbitrarily defined limit for initiating defragmentation of the resource storage. Calculating to determine whether the resource availability threshold is exceeded may occur periodically, in response to a trigger (e.g., upon receiving a request to access a managed resource), and/or at any number of predefined times (e.g., when a CPU and/or resource storage utilization rate is below a certain limit).

In STEP 405, in one or more embodiments of the invention, two or more unallocated segments of the resource storage are identified. The segments may be identified by performing a linear sweep of one or more segments of the resource storage and/or by using any known method of identifying free memory, in accordance with various embodiments of the invention.

In STEP 410, in one or more embodiments of the invention, the resource storage is compacted by consolidating the unallocated segments into a single contiguous segment. Compacting the resource storage may include moving one or more managed resources in order to consolidate one or more unallocated segments.

In STEP 415, in one or more embodiments of the invention, the payload of one or more binary resource values are updated to reference a new resource address of the managed resource in the resource storage. Any number of resource values currently referencing the managed resource may be updated. In one or more embodiments of the invention, if it is determined that no resource values referencing the managed resource remain, a segment of memory corresponding to the managed resource is freed in the resource storage.

The following section describes various examples of the invention. The examples are included to aid in the understanding of the invention but are not intended to limit the scope of the invention.

In one example, a thread is executing in a runtime environment of a computer system with a 64-bit architecture with word alignment.

Figure 5A:
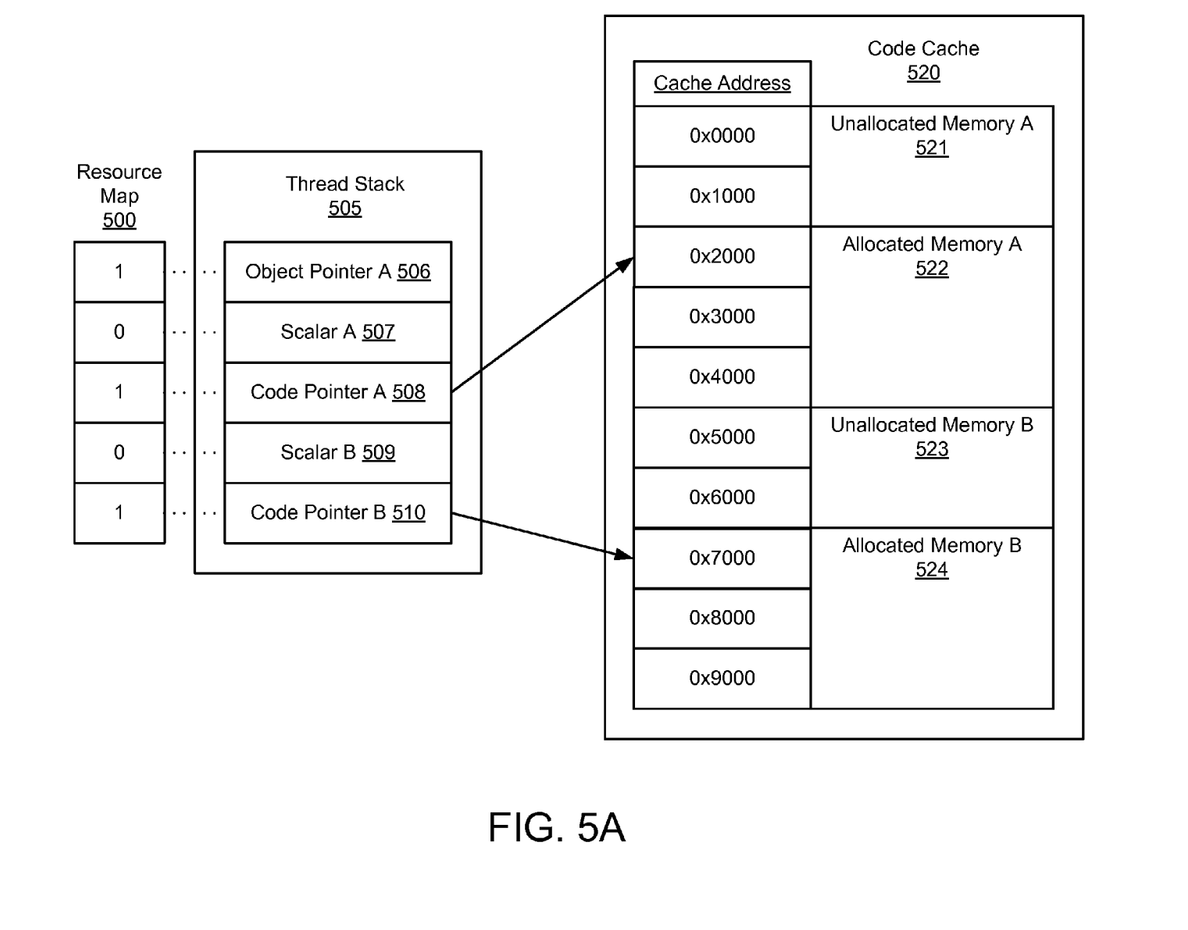
FIGS. 5A and 5B show an example system in accordance with one or more embodiments of the invention.

While the thread is executing, the virtual machine allocates a thread stack (505) to the thread. The runtime environment includes a code cache (520) storing machine code instructions in chunks of contiguous address space. Thread stack (505) includes two scalars (i.e., scalar A (507) and scalar B (509)), an object pointer (i.e., object pointer A (506)), and two code pointers (i.e., code pointer A (508) and code pointer B (510)). FIG. 5A depicts the state of the thread stack and the code cache at this point in time. Resource map (500) includes a single bit for each entry in the thread stack (505).

Continuing the example, at a later point in time, the virtual machine requests memory in the code cache. The request is received by a memory manager of the virtual machine. The memory manager determines that the code cache does not have sufficient unallocated memory to fulfill the request and that, resultantly, a resource availability threshold has been exceeded. As a result, the memory manager initiates code eviction on the code cache.

At this time, the memory manager begins the process of identifying stack roots (i.e., resource values) and marking allocated resources in the code cache corresponding to the stack roots. The memory manager reads bit values from resource map (500) which corresponds to the thread stack (505). Upon encountering a bit value of '1' in resource map (500), the memory manager knows that the corresponding entry in thread stack (505) contains a binary value denoting a managed resource. Each such 64-bit binary value includes a single resource identifier bit and a 63-bit payload. The memory manager reads the resource identifier bit of object pointer A (506) and, based on the resource identifier bit value being '0', the memory manager determines that the payload is a reference to a managed object in heap memory. In this example, managed objects in heap memory are maintained by a garbage collector (i.e., a different memory manager) of the virtual machine.

Continuing the example, the memory manager then reads a bit value of '0' in the resource map corresponding to the entry storing scalar A (507). Based on the bit value, the memory manager determines that the corresponding entry in the thread stack (505) does not denote a managed resource.

Continuing the example, the memory manager then reads a bit value of '1' in the resource map corresponding to the entry storing code pointer A (508). Based on the bit value, the memory manager determines that the corresponding entry in the thread stack (505) denotes a managed resource. Thus, the memory manager then reads a resource identifier bit of code pointer A (508) and identifies the managed resource as being of a code pointer type. As a result, the memory manager interprets at least a portion of the 63-bit payload as a reference to cache address "0x2000" in the code cache (520) and marks allocated memory A (522) as being referenced.

Continuing the example, the memory manager then reads a bit value of '0' in the resource map corresponding to the entry storing scalar B (509). Based on the bit value, the memory manager determines that the corresponding entry in the thread stack (505) does not denote a managed resource.

Continuing the example, the memory manager then reads a bit value of '1' in the resource map corresponding to the entry storing code pointer B (510). Based on the bit value, the memory manager determines that the corresponding entry in the thread stack (505) denotes a managed resource. Thus, the memory manager then reads a resource identifier bit of code pointer B (510) and identifies the managed resource as being of a code pointer type. As a result, the memory manager interprets at least a portion of the 63-bit payload as a reference to cache address "0x7000" in the code cache (520) and marks allocated memory B (524) as being referenced.

Continuing the example, based on the analysis above, the memory manager then sweeps the code cache to identify memory which can be reclaimed. As a sweep of the code cache is performed, addresses in the cache are compared to "marked" addresses in order to determine if they can be reclaimed.

Figure 5B:
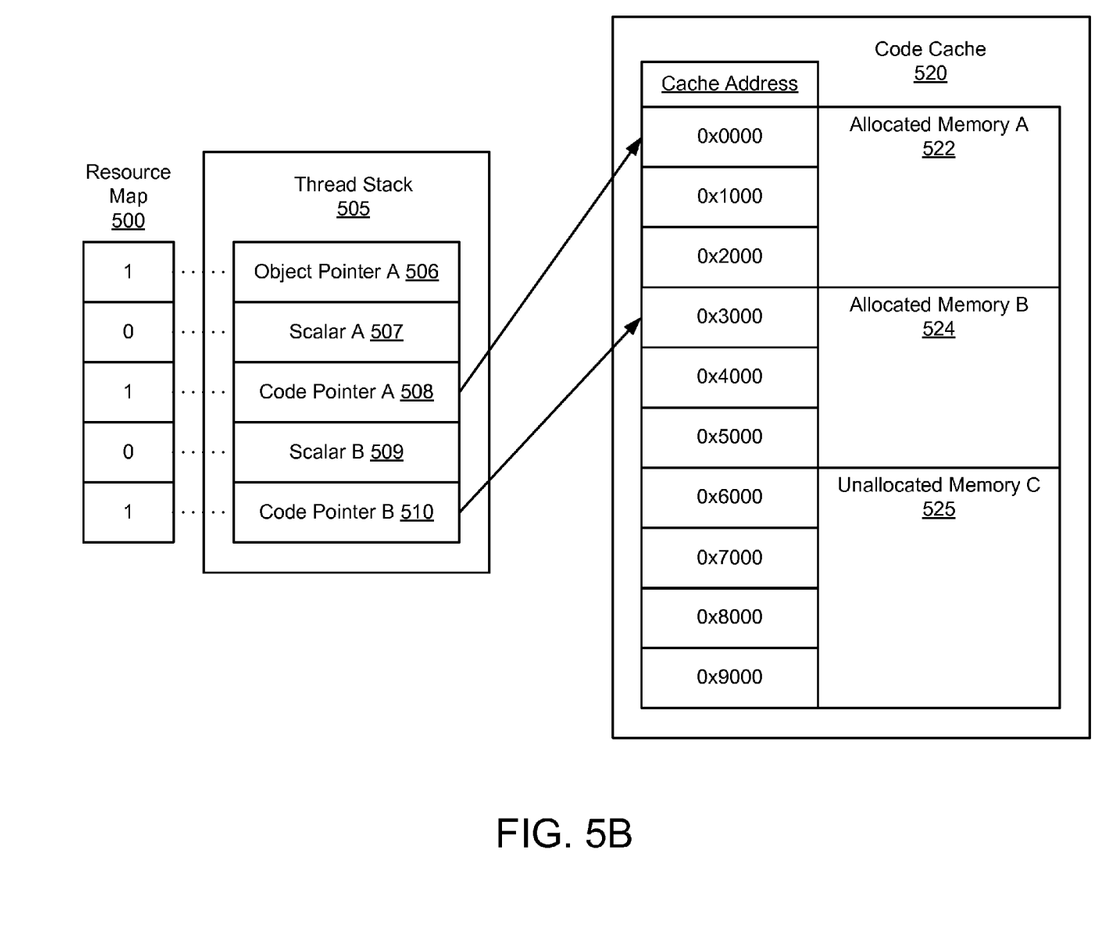

Continuing the example, the memory manager identifies, based on the sweep, all segments of unallocated memory in the code cache (i.e., unallocated memory A (521) and unallocated memory B (523)). The memory manager then compacts the code cache (520) by moving allocated memory A (521) to address "0x0000" and moving allocated memory B (523) to address "0x3000". The memory manager then updates the payload values of code pointer A (508) and code pointer B (510) to point to the addresses of allocated memory A (521) and allocated memory B (523). FIG. 5B depicts the state of the thread stacks and the code cache after the compaction is complete. After completing the compaction, the memory manager allocates a portion of unallocated memory C (525) in response to the original request to allocate memory. For illustrative purposes, FIGS. 5A, and 5B show only a portion of the code cache and other components which are directly relevant to the current example.

Figure 6:
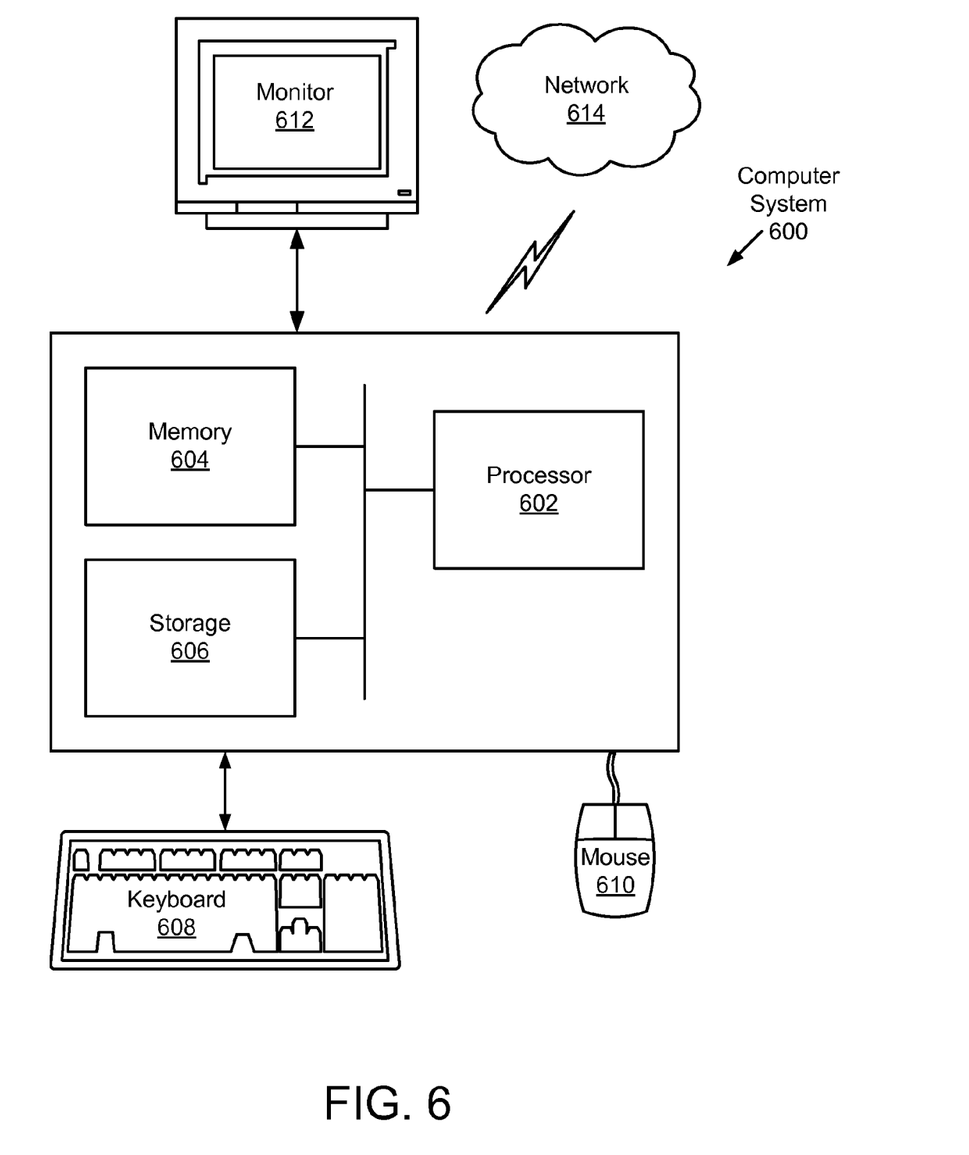
FIG. 6 shows a computer system in accordance with one or more embodiments of the invention.

Embodiments of the invention may be implemented on virtually any type of computer regardless of the platform being used. For example, as shown in FIG. 6, a computer system (600) includes one or more processor(s) (602) (such as a central processing unit (CPU), integrated circuit, hardware processor, etc.), associated memory (604) (e.g., RAM, cache memory, flash memory, etc.), a storage device (606) (e.g., a hard disk, an optical drive such as a compact disk drive or digital video disk (DVD) drive, a flash memory stick, etc.), and numerous other elements and functionalities typical of today's computers (not shown). The computer system (600) may also include input means, such as a keyboard (608), a mouse (610), or a microphone (not shown). Further, the computer system (600) may include output means, such as a monitor (612) (e.g., a liquid crystal display (LCD), a plasma display, or cathode ray tube (CRT) monitor). The computer system (600) may be connected to a network (614) (e.g., a local area network (LAN), a wide area network (WAN) such as the Internet, or any other type of network) via a network interface connection (not shown). Those skilled in the art will appreciate that many different types of computer systems exist, and the aforementioned input and output means may take other forms. Generally speaking, the computer system (600) includes at least the minimal processing, input, and/or output means necessary to practice embodiments of the invention.

Further, in one or more embodiments of the invention, one or more elements of the aforementioned computer system (600) may be located at a remote location and connected to the other elements over a network. Further, embodiments of the invention may be implemented on a distributed system having a plurality of nodes, where each portion of the invention (e.g., runtime environment (110), memory manager (100), resource storage (120), etc. of FIG. 1, discussed above) may be located on a different node within the distributed system. In one embodiment of the invention, the node corresponds to a computer system. Alternatively, the node may correspond to a processor with associated physical memory. The node may alternatively correspond to a processor or micro-core of a processor with shared memory and/or resources. Further, software instructions in the form of computer readable program code to perform embodiments of the invention may be stored, temporarily or permanently, on a non-transitory computer readable storage medium, such as a compact disc (CD), a diskette, a tape, memory, or any other tangible computer readable storage device.

One or more embodiments of the invention have one or more of the following advantages. By managing multiple types of resources, it may be possible to perform compaction and/or various maintenance operations on one or more resource storages while providing access to the managed resources to any number of threads and/or clients.

Furthermore, by using a combination of bit tagging (i.e., using resource identifier bits) and a resource map, it may be possible to decrease the overhead associated with identifying stack roots (i.e., resource values) in a thread stack of an executing thread.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for resource management, comprising:
identifying a resource map corresponding to a thread stack of a first thread;
reading, in the resource map and by a computer processor, a bit value referencing an address of a first binary value in the thread stack;
determining, based on the bit value and by the computer processor, that the first binary value corresponds to a managed resource;
reading, by the computer processor, a resource identifier section of the first binary value after determining that the first binary value corresponds to the managed resource;
determining a type of the managed resource based on the resource identifier section;
interpreting, based on the type of the managed resource, at least a portion of a payload of the first binary value as a reference to a resource address of the managed resource in a resource storage; and
accessing, in the resource storage, the managed resource using the reference.

2. The method of claim 1, further comprising:
determining that the resource storage comprising the managed resource has exceeded a resource availability threshold;
identifying a plurality of unallocated segments of the resource storage;
compacting the resource storage by consolidating the plurality of unallocated segments into a single contiguous segment, wherein compacting the resource storage comprises moving the managed resource; and
updating, after compacting the memory, the payload of the first binary value to reference a new resource address of the managed resource in the resource storage.

3. The method of claim 2, wherein the managed resource is a plurality of executable code, wherein the first binary value represents a code pointer to the plurality of executable code, and wherein the method further comprises:
executing the plurality of executable code after updating the payload of the first binary value.

4. The method of claim 2, wherein the managed resource is an object, and wherein the method further comprises:
creating a direct inner object pointer to a frequently accessed inner object of the object;
detecting that the object is moved; and
updating the direct inner object pointer in response to detecting that the object is moved.

5. The method of claim 2, wherein the managed resource is a shared memory accessible by the first thread and a second thread executing on the computer processor.

6. The method of claim 2, wherein the managed resource is one selected from a group consisting of a result set retrieved from a database and a file in a file system.

7. The method of claim 1, further comprising:
tracking the managed resource in an external memory outside of a runtime environment of the first thread, wherein the managed resource is a native object.

8. The method of claim 1, wherein the managed resource is a remote object residing in a remote host, wherein the reference comprises a network address of the remote host, and wherein the method further comprises:
periodically sending a notification of object liveliness to the remote host;
determining, after periodically sending the notification, that the remote object is no longer referenced by the first thread; and
sending a release notification to the remote host, wherein the remote host determines that the remote object is no longer referenced by any executing processes, and wherein the remote host frees a portion of the resource storage storing the remote object upon receiving the release notification.

9. The method of claim 1, wherein the first thread is implemented in a host programming language, wherein the first thread is executed in a multi-language runtime environment implemented in the host programming language, and wherein the method further comprises:
executing, by the computer processor, a second thread implemented using a guest programming language, wherein the host programming language and the guest programming language have different object reference semantics;
identifying a second binary value within a thread stack of the second thread;
reading a plurality of resource identifier bits of the second binary value;
determining, by the computer processor and based on the plurality of resource identifier bits, that the second binary value comprises an object pointer to an entry in an object table, wherein the object pointer has a resource type of the guest programming language; and
accessing an object referenced by the entry in the object table.

10. The method of claim 1, further comprising:
storing the managed resource in a heap memory.

11. The method of claim 1, wherein the resource identifier section is a plurality of least significant bits of the binary value.

12. A system for resource management, comprising:
a computer processor;
a first thread executing on the computer processor;
a resource map corresponding to a thread stack of the first thread and comprising:
a plurality of bit values mapped to addresses of the thread stack; and
a memory manager executing on the computer processor and configured to:
read, in the resource map, a bit value referencing an address of a first binary value in the thread stack;
determine, based on the bit value, that the first binary value corresponds to a managed resource;
read a resource identifier section of the first binary value after determining that the first binary value corresponds to the managed resource;
determine a type of the managed resource based on the resource identifier section;
interpret, based on the type of the managed resource, at least a portion of a payload of the first binary value as a reference to a resource address of the managed resource in a resource storage; and
access, in the resource storage, the managed resource using the reference.

13. The system of claim 12, further comprising:
a virtual machine comprising the memory manager, executing on the computer processor, and configured to execute the first thread.

14. The system of claim 12, wherein the memory manager is further configured to:

determine that the resource storage comprising the managed resource has exceeded a resource availability threshold;

identify a plurality of unallocated segments of the resource storage;

compact the resource storage by consolidating the plurality of unallocated segments into a single contiguous segment, wherein compacting the resource storage comprises moving the managed resource; and update, after compacting the memory, the payload of the first binary value to reference a new resource address of the managed resource in the resource storage.

15. The system of claim 14, wherein the managed resource is a plurality of executable code, wherein the first binary value represents a code pointer to the plurality of executable code, and wherein the computer processor is further configured to:

execute the plurality of executable code after updating the payload of the first binary value.

16. The system of claim 12, wherein the first thread is implemented in a host programming language, and wherein the system further comprises:

a multi-language runtime environment implemented in the host programming language and comprising the memory manager;

a second thread executing on the computer processor, wherein the second thread is implemented in a guest programming language, and wherein the host programming language and the guest programming language have different object reference semantics, wherein the memory manager is further configured to:
identify a second binary value within a thread stack of the second thread;

read a plurality of resource identifier bits of the second binary value;

determine, based on the plurality of resource identifier bits, that the second binary value references an object type of the guest programming language;

interpret, based on the object type, at least a portion of a payload of the second binary value as a reference to a managed object in the resource storage; and access the managed object in the resource storage.

17. The system of claim 16, wherein the managed resource is a shared memory accessible by the first thread and the second thread.

18. The system of claim 12, wherein the resource identifier section is a single least significant bit of the binary value.

19. A non-transitory computer-readable storage medium comprising a plurality of instructions for resource management, the plurality of instructions comprising functionality to:

identify a resource map corresponding to a thread stack of a first thread;

read, in the resource map, a bit value referencing an address of a first binary value in the thread stack;

determine, based on the bit value, that the first binary value corresponds to a managed resource;

read a resource identifier section of the first binary value after determining that the first binary value corresponds to the managed resource;

determine a type of the managed resource based on the resource identifier section;

interpret, based on the type of the managed resource, at least a portion of a payload of the first binary value as a reference to a resource address of the managed resource in a resource storage; and access, in the resource storage, the managed resource using the reference.

20. The non-transitory computer-readable storage medium of claim 19, wherein the plurality of instructions further comprise functionality to:

determine that the resource storage comprising the managed resource has exceeded a resource availability threshold;

identify a plurality of unallocated segments of the resource storage;

compact the resource storage by consolidating the plurality of unallocated segments into a single contiguous segment, wherein compacting the resource storage comprises moving the managed resource; and update, after compacting the memory, the payload of the first binary value to reference a new resource address of the managed resource in the resource storage.

* * * * *